United States Patent
Isoda

(10) Patent No.: US 6,515,270 B1
(45) Date of Patent: Feb. 4, 2003

(54) RADIATION IMAGE READ-OUT METHOD AND APPARATUS

(75) Inventor: Yuji Isoda, Kaisei-machi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/567,440

(22) Filed: May 10, 2000

(30) Foreign Application Priority Data

May 20, 1999 (JP) .......................................... 11-140748

(51) Int. Cl.[7] ................................................ G03C 5/16
(52) U.S. Cl. .................................. 250/208.1; 250/484.4
(58) Field of Search ........................... 250/484.4, 484.5, 250/584, 585, 586, 309, 372, 361 R, 458.1, 365, 459.1, 363.01, 461.1, 483.1, 484.2, 485.1

(56) References Cited

U.S. PATENT DOCUMENTS

| | | | |
|---|---|---|---|
| 4,289,377 A | * 9/1981 | Matsui et al. | 350/169 |
| 4,767,927 A | * 8/1988 | Ohyama et al. | 250/327.2 |
| 4,816,679 A | 3/1989 | Sunagawa et al. | 250/327.2 |
| 4,922,103 A | 5/1990 | Kawajiri et al. | 250/327.2 |
| 4,926,045 A | * 5/1990 | Hosoi et al. | 250/327.2 |
| 5,814,524 A | 9/1998 | Walt et al. | |
| 6,175,645 B1 | * 1/2001 | Elyasaf et al. | 382/147 |

FOREIGN PATENT DOCUMENTS

| | | |
|---|---|---|
| EP | 4 479 027 A2 | 4/1992 |
| EP | 0 863 657 A2 | 9/1998 |
| EP | 0 964 269 A2 | 12/1999 |

* cited by examiner

Primary Examiner—Robert H. Kim
Assistant Examiner—Hoon K. Song
(74) Attorney, Agent, or Firm—Sughrue Mion, PLLC

(57) ABSTRACT

Stimulating rays produced by a line light source are linearly irradiated onto an area of one surface of a stimulable phosphor sheet, on which a radiation image has been stored. The stimulating rays cause the sheet to emit light in proportion to an amount of energy stored thereon during its exposure to radiation. Light, which is emitted from the linear area of the one surface of the sheet exposed to the linear stimulating rays or from a linear area of the other surface corresponding to the linear area of the one surface, is received with a line sensor comprising photoelectric conversion devices arrayed along a length direction of the linear area of the sheet. The sheet is moved with respect to the line light source and the line sensor and in a direction different from the length direction of the linear area of the sheet. A distributed index lens array comprising distributed index lenses arrayed along the length direction of the linear area of the sheet is located between the sheet and the line sensor.

4 Claims, 9 Drawing Sheets

SECT. I-I

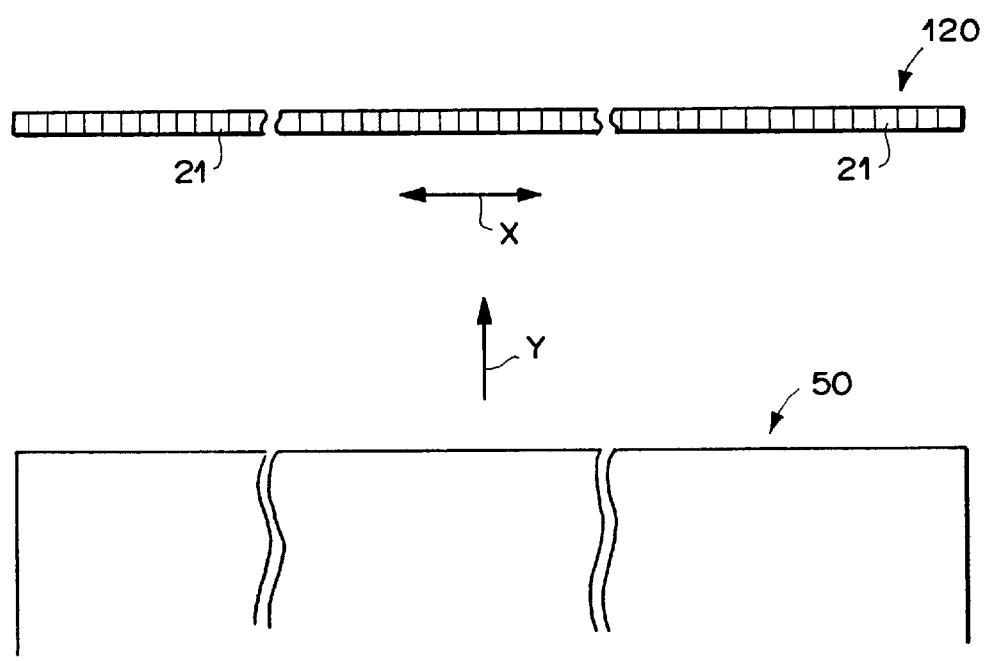

SECT. I-I

FIG. 4
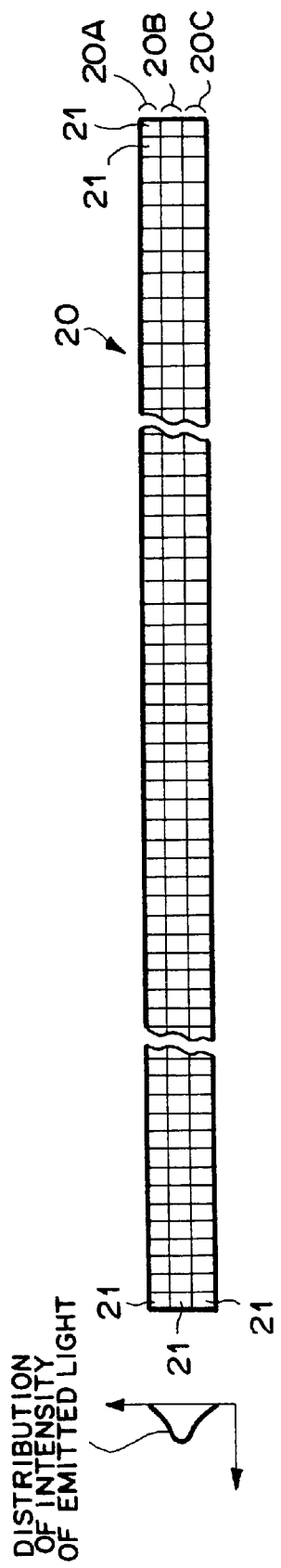
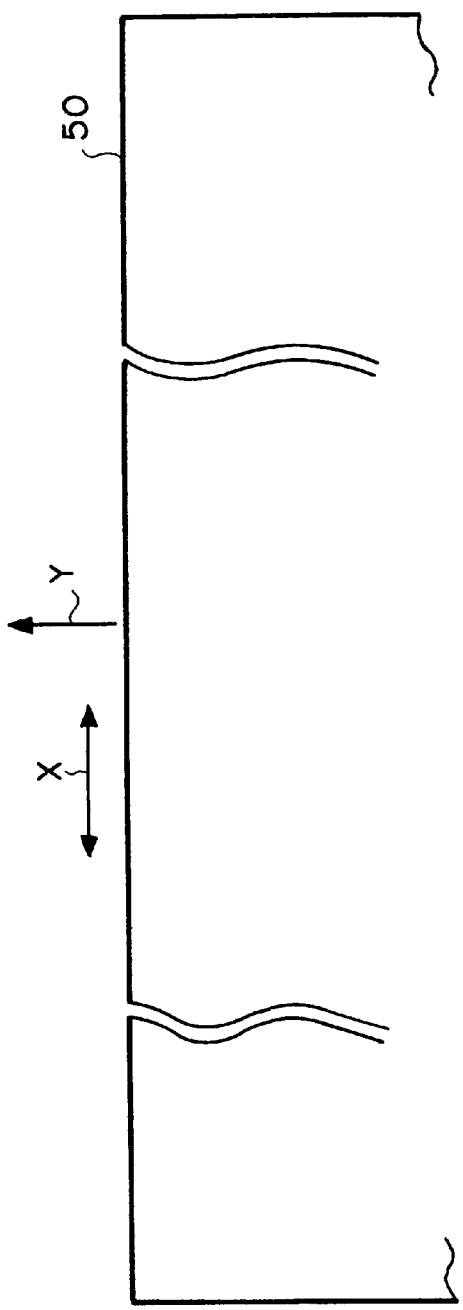

RADIATION IMAGE READ-OUT METHOD AND APPARATUS

BACKGROUND OF THE INVENTION

1. Field of the Invention

This invention relates to a radiation image read-out method and apparatus. This invention particularly relates to a radiation image read-out method and apparatus, wherein light emitted by a stimulable phosphor sheet is detected with a line sensor.

2. Description of the Prior Art

It has been proposed to use stimulable phosphors in radiation image recording and reproducing systems. Specifically, a radiation image of an object, such as a human body, is recorded on a stimulable phosphor sheet, which comprises a substrate and a layer of the stimulable phosphor overlaid on the substrate. Stimulating rays, such as a laser beam, are deflected and caused to scan pixels in the radiation image, which has been stored on the stimulable phosphor sheet, one after another. The stimulating rays cause the stimulable phosphor sheet to emit light in proportion to the amount of energy stored thereon during its exposure to the radiation. The light emitted successively from the pixels in the radiation image having been stored on the stimulable phosphor sheet, upon stimulation thereof, is photoelectrically detected and converted into an electric image signal by photoelectric read-out means. The stimulable phosphor sheet, from which the image signal has been detected, is then exposed to erasing light, and radiation energy remaining thereon is thereby released.

The image signal, which has been obtained from the radiation image recording and reproducing systems, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or on a high resolution cathode ray tube (CRT) display device. The stimulable phosphor sheet, from which residual radiation energy has been released with the erasing light, can be used again for the recording of a radiation image.

Novel radiation image read-out apparatuses for use in the radiation image recording and reproducing systems described above have been proposed in, for example, Japanese Unexamined Patent Publication Nos. 60(1985)-111568 and 60(1985)-236354. In the proposed radiation image read-out apparatuses, from the point of view of keeping the emitted light detection time short, reducing the size of the apparatus, and keeping the cost low, a line light source, such as a fluorescent lamp, a cold cathode fluorescent lamp, or a light emitting diode (LED) array, for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which the stimulating rays are irradiated by the line light source, is utilized as photoelectric read-out means. Also, the proposed radiation image read-out apparatuses comprise scanning means for moving the stimulable phosphor sheet with respect to the line light source and the line sensor and in a direction, which is approximately normal to the length direction of the linear area of the stimulable phosphor sheet.

As for techniques for detecting the light, which is emitted by the stimulable phosphor sheet, with the line sensor, a technique may be considered, in which the emitted light is guided by a cylindrical lens or optical fibers to the line sensor. A technique may also be considered, in which the line sensor is located close to the stimulable phosphor sheet so as to directly receive the emitted light without an optical system intervening between the line sensor and the stimulable phosphor sheet.

However, in cases where the line light source is employed and the emitted light is detected with the line sensor, the light is emitted from the linear area, instead of a point, on the stimulable phosphor sheet. Therefore, in order for an image having high sharpness to be obtained, not only the intensity of the emitted light but also the information concerning the position of light emission must be detected accurately.

Specifically, if the emitted light spreads and impinges upon the line sensor, the light emitted from a single point on the stimulable phosphor sheet will impinge upon a plurality of photoelectric conversion devices constituting the line sensor. Therefore, in such cases, the position, from which the light is emitted, and the intensity of the emitted light cannot be detected accurately. For example, in cases where the light emitted by the stimulable phosphor sheet is guided by a cylindrical lens extending in the length direction of the line sensor, the emitted light is converged with respect to the direction normal to the length direction of the line sensor (i.e., with respect to the direction having a curvature). However, in such cases, the emitted light diverges with respect to the length direction of the line sensor (i.e., with respect to the direction having no curvature). Therefore, a high light collecting efficiency cannot be obtained, and the position from which the light is emitted cannot be detected accurately.

With the technique for guiding the emitted light through optical fibers to the line sensor or the technique for directly receiving the emitted light by the line sensor, the end faces of the optical fibers or the line sensor must be located close to the stimulable phosphor sheet. However, in the image read-out operation, the stimulable phosphor sheet is moved relative to the line sensor. Therefore, it is necessary for a spacing to be left between the line sensor and the stimulable phosphor sheet. The spacing between the line sensor and the stimulable phosphor sheet is markedly larger than the spacing (e.g., approximately 0.1 mm) between adjacent photoelectric conversion devices of the line sensor. Accordingly, as in the cases where the cylindrical lens is employed, a high light collecting efficiency cannot be obtained, and the position from which the light is emitted cannot be detected accurately.

SUMMARY OF THE INVENTION

The primary object of the present invention is to provide a radiation image read-out method, wherein an intensity of light emitted by a stimulable phosphor sheet and a position from which the light is emitted are capable of being detected with a high light collecting efficiency and a high spatial resolution, and an image having a high sharpness is capable of being formed from information having been obtained from the detection of the emitted light.

Another object of the present invention is to provide an apparatus for carrying out the radiation image read-out method.

The present invention provides a radiation image read-out method, comprising the steps of:

i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of photoelectric conversion devices arrayed along a length direction of the linear area of the stimulable phosphor sheet, the received light being subjected to photoelectric conversion performed by the line sensor, and iii) moving the stimulable phosphor sheet with respect to the line light source and the line sensor and in a direction different from the length direction of the linear area of the stimulable phosphor sheet, wherein the light, which is emitted from the linear area of the one surface of the stimulable phosphor sheet or from the linear area of the other surface of the stimulable phosphor sheet, is converged by a distributed index lens array, which is located between the stimulable phosphor sheet and the line sensor and which comprises a plurality of distributed index lenses arrayed along the length direction of the linear area of the stimulable phosphor sheet.

In the radiation image read-out method in accordance with the present invention, the line sensor should preferably comprise a plurality of the photoelectric conversion devices arrayed along the length direction of the linear area of the stimulable phosphor sheet and along the direction different from the length direction of the linear area of the stimulable phosphor sheet.

Also, in the radiation image read-out method in accordance with the present invention, the distributed index lens array should preferably satisfy the formula:

$$N \times \{1 - \cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens.

Further, in the radiation image read-out method in accordance with the present invention, the working distance of the distributed index lens should preferably fall within the range of 1 mm to 10 mm.

Furthermore, in the radiation image read-out method in accordance with the present invention, the distributed index lens array should preferably have a transmittance of at least 80% with respect to a light component having a wavelength exhibiting the highest intensity among the light components of the light emitted by the stimulable phosphor sheet.

As will be understood from the specification, it should be noted that the term "moving a stimulable phosphor sheet with respect to a line light source and a line sensor" as used herein means movement of the stimulable phosphor sheet relative to the line light source and the line sensor, and embraces the cases wherein the stimulable phosphor sheet is moved while the line light source and the line sensor are kept stationary, the cases wherein the line light source and the line sensor are moved while the stimulable phosphor sheet is kept stationary, and the cases wherein both the stimulable phosphor sheet and the line light source and the line sensor are moved. In cases where the line light source and the line sensor are moved, they should be moved together with each other.

The direction along which the stimulable phosphor sheet is moved with respect to the line light source and the line sensor (i.e., the direction different from the length direction of the exposed linear area of the stimulable phosphor sheet) should preferably be the direction approximately normal to the length direction (i.e., the major axis direction) of the exposed linear area of the stimulable phosphor sheet, i.e. should preferably be the minor axis direction. However, the direction along which the stimulable phosphor sheet is moved with respect to the line light source and the line sensor is not limited to the minor axis direction. For example, in cases where the lengths of the line light source and the line sensor are longer than one side of the stimulable phosphor sheet, the stimulable phosphor sheet may be moved with respect to the line light source and the line sensor along an oblique direction with respect to the direction approximately normal to the length direction of the line light source and the line sensor or along a zigzag movement direction, such that approximately the entire surface of the stimulable phosphor sheet may be uniformly exposed to the stimulating rays.

The line sensor employed in the radiation image read-out method in accordance with the present invention may comprise the plurality of the photoelectric conversion devices arrayed along only the length direction (i.e., the major axis direction). Alternatively, the line sensor may comprise the plurality of the photoelectric conversion devices arrayed along each of the major axis direction and the minor axis direction, which is normal to the major axis direction. In such cases, the plurality of the photoelectric conversion devices may be arrayed in a matrix-like pattern such that they may stand in a straight line along each of the major axis direction and the minor axis direction. Alternatively, the photoelectric conversion devices may be arrayed such that they may stand in a straight line along the major axis direction and in a zigzag pattern along the minor axis direction. As another alternative, the photoelectric conversion devices may be arrayed such that they may stand in a straight line along the minor axis direction and in a zigzag pattern along the major axis direction. As a further alternative, the photoelectric conversion devices may be arrayed such that they may stand in a zigzag pattern along each of the major axis direction and the minor axis direction.

The length of the line sensor, as measured at the light receiving surface, should preferably be longer than or equal to the length of one side of the effective image storing region of the stimulable phosphor sheet. In cases where the length of the light receiving surface of the line sensor is longer than the length of one side of the effective image storing region of the stimulable phosphor sheet, the line sensor may be located obliquely with respect to the side of the effective image storing region of the stimulable phosphor sheet.

The line light source and the line sensor may be located on the same surface side of the stimulable phosphor sheet or on opposite surface sides of the stimulable phosphor sheet. Also, two line sensors may be located on opposite surface sides of the stimulable phosphor sheet. In cases where the line light source and the line sensor are located on opposite surface sides of the stimulable phosphor sheet, the substrate of the stimulable phosphor sheet, or the like, should be formed from a material permeable to the emitted light, such that the emitted light may permeate to the surface side of the stimulable phosphor sheet opposite to the surface on the stimulating ray incidence side.

The present invention also provides an apparatus for carrying out the radiation image read-out method in accordance with the present invention. Specifically, the present invention also provides a radiation image read-out apparatus, comprising:

i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising a plurality of arrayed photoelectric conversion devices, and iii) scanning means for moving the stimulable phosphor sheet with respect to the line light source and the line sensor and in a direction different from a length direction of the linear area of the stimulable phosphor sheet, wherein a distributed index lens array, which comprises a plurality of distributed index lenses arrayed along the length direction of the linear area of the stimulable phosphor sheet, is located between the stimulable phosphor sheet and the line sensor in order to converge the light, which is emitted from the linear area of the one surface of the stimulable phosphor sheet or from the linear area of the other surface of the stimulable phosphor sheet.

In the radiation image read-out apparatus in accordance with the present invention, the line sensor should preferably comprise a plurality of the photoelectric conversion devices arrayed along the length direction of the linear area of the stimulable phosphor sheet and along the direction different from the length direction of the linear area of the stimulable phosphor sheet.

Also, in the radiation image read-out apparatus in accordance with the present invention, the distributed index lens array should preferably satisfy the formula:

$$N \times \{1 - \cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens.

Further, in the radiation image read-out apparatus in accordance with the present invention, the working distance of the distributed index lens should preferably fall within the range of 1 mm to 10 mm.

Furthermore, in the radiation image read-out apparatus in accordance with the present invention, the distributed index lens array should preferably have a transmittance of at least 80% with respect to a light component having a wavelength exhibiting the highest intensity among the light components of the light emitted by the stimulable phosphor sheet.

With the radiation image read-out method and apparatus in accordance with the present invention, the light, which is emitted by the stimulable phosphor sheet when the stimulable phosphor sheet is exposed to the stimulating rays produced by the line light source, is converged by the image, forming optical system (i.e., the distributed index lens array), which is located in the optical path between the line light source for linearly irradiating the stimulating rays onto the stimulable phosphor sheet and the line sensor for receiving the emitted light and photoelectrically converting it. The image forming optical system has object points on the light emission surface of the stimulable phosphor sheet has image points on the light receiving surface of the line sensor. Therefore, the information (i.e., the image carrying the information) representing the intensity distribution of the emitted light on the light emission surface of the stimulable phosphor sheet can be directly formed on the light receiving surface of the line sensor. Accordingly, even if the optical system for collecting the light emitted by the stimulable phosphor sheet is located at a spacing from the stimulable phosphor sheet, the intensity of light emitted by the stimulable phosphor sheet and the position from which the light is emitted can be detected with a high light collecting efficiency and a high spatial resolution, and an image having a high sharpness can be formed from image signal information having been obtained from the detection of the emitted light.

Also, with the radiation image read-out method and apparatus in accordance with the present invention, the line sensor may comprise the plurality of the photoelectric conversion devices arrayed along the length direction of the linear area of the stimulable phosphor sheet and along the direction normal to the length direction of the linear area of the stimulable phosphor sheet. In such cases, if the line width of the light emitted by the stimulable phosphor sheet, which line width is formed on the light receiving surface of the line sensor, is larger than the light receiving width of each photoelectric conversion device, the line sensor as a whole can receive the emitted light over the range of the large line width of the emitted light, which line width is formed on the light receiving surface of the line sensor. As a result, the light collecting efficiency can be enhanced even further.

Further, with the radiation image read-out method and apparatus in accordance with the present invention, wherein the distributed index lens array satisfies the formula shown below, the light collecting efficiency of the distributed index lenses can be kept to be at least 10%.

$$N \times \{1 - \cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens.

Furthermore, with the radiation image read-out method and apparatus in accordance with the present invention, wherein the working distance of the distributed index lens falls within the range of 1 mm to 10 mm, the movement of the stimulable phosphor sheet with respect to the line light source and the line sensor is not obstructed. Also, the light collecting efficiency can be prevented from becoming low, and an image having a high sharpness can be obtained.

Also, with the radiation image read-out method and apparatus in accordance with the present invention, wherein the distributed index lens array has a transmittance of at least 80% with respect to the light component having the wavelength exhibiting the highest intensity among the light components of the light emitted by the stimulable phosphor sheet, a desired light collecting efficiency can be kept, and an image having a high sharpness can be obtained.

BRIEF DESCRIPTION OF THE DRAWINGS

FIG. 2 is an explanatory view showing a line sensor in the embodiment of FIG. 1A, FIG. 4 is an explanatory view showing a line sensor in the embodiment of FIG. 3A, FIGS. 5A and 5B are explanatory views showing relationship between a beam width of stimulating rays and a beam width of emitted light.

DESCRIPTION OF THE PREFERRED EMBODIMENTS

The present invention will hereinbelow be described in further detail with reference to the accompanying drawings.

Figure 1A:
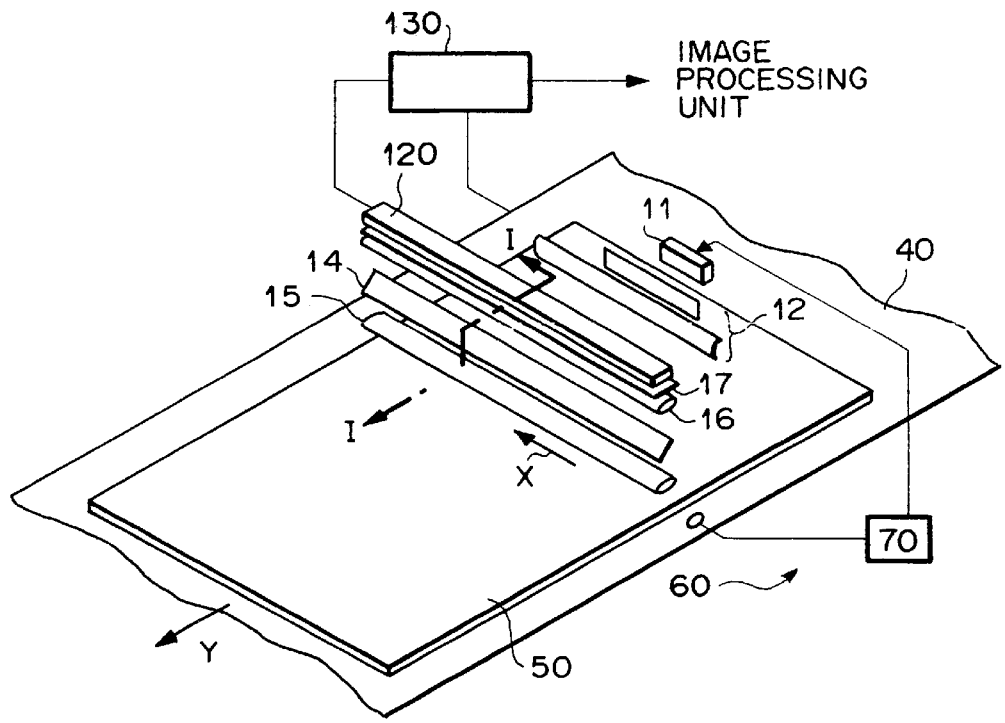
FIG. 1A is a perspective view showing a first embodiment of the radiation image read-out apparatus in accordance with the present invention.
Figure 1B:
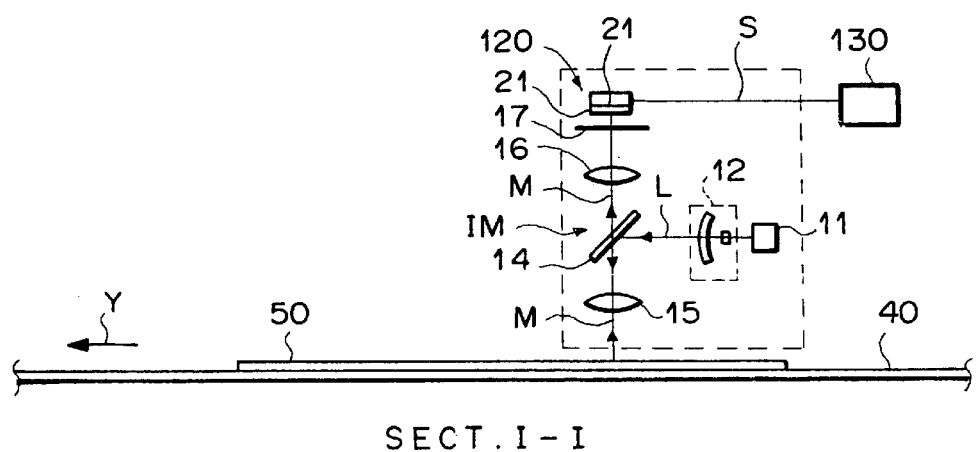
FIG. 1B is a sectional view taken on line I—I of FIG. 1A.

FIG. 1A is a perspective view showing a first embodiment of the radiation image read-out apparatus in accordance with the present invention. FIG. 1B is a sectional view taken on line I—I of FIG. 1A. FIG. 2 is an explanatory view showing a line sensor in the embodiment of FIG. 1A.

With reference to FIGS. 1A and 1B, the radiation image read-out apparatus comprises scanning belt 40 for supporting a stimulable phosphor sheet (hereinbelow referred to simply as the sheet) 50, on which a radiation image has been stored, and conveying the sheet 50 in the direction indicated by the arrow Y. The radiation image read-out apparatus also comprises a broad area semiconductor laser (hereinbelow referred to as the BLD) 11 for radiating out a linear laser beam L having a linear pattern with a line width of approximately 100 $\mu$m and having wavelengths falling within the range of 600 $\mu$m to 700 $\mu$m. The laser beam L acts as stimulating rays and is radiated out approximately in parallel with the surface of the sheet 50. The radiation image read-out apparatus further comprises an optical system 12, which is constituted of a combination of a converging lens for converging the linear laser beam L having been radiated out of the BLD 11 and a toric lens for expanding the beam only in one direction. The radiation image read-out apparatus still further comprises a dichroic mirror 14, which is located at an angle of 45 degrees with respect to the surface of the sheet 50 and which is set so as to reflect the laser beam L and to transmit emitted light M described later. The radiation image read-out apparatus also comprises a first distributed index lens array (constituted of an array of a plurality of distributed index lenses) 15. The first distributed index lens array 15 converges (forms the image of) the linear laser beam L, which has been reflected from the dichroic mirror 14, into a linear beam (having a line width of approximately 100 $\mu$m) extending along the direction indicated by the arrow X on the sheet 50. Also, the first distributed index lens array 15 forms an image of the emitted M, which is emitted by the sheet 50 exposed to the linearly converged laser beam L and which carries image information of the radiation image stored on the sheet 50, as an aerial image IM in the vicinity of the dichroic mirror 14. The radiation image read-out apparatus further comprises a second distributed index lens array 16 for forming an image of the aerial image IM, which has been formed by the first distributed index lens array 15, on light receiving surfaces of photoelectric conversion devices 21, 21, . . . constituting a line sensor 120, which will be described later. The radiation image read-out apparatus still further comprises a stimulating ray cut-off filter 17 for transmitting only the emitted light M and filtering out the laser beam L, which has been reflected from the surface of the sheet 50 and which is mixed slightly in the emitted light M having passed through the second distributed index lens array 16. The radiation image read-out apparatus also comprises the line sensor 120, which is constituted of a plurality of photoelectric conversion devices 21, 21, . . . for receiving the emitted light M having passed through the stimulating ray cut-off filter 17 and for photoelectrically converting the emitted light M. The radiation image read-out apparatus further comprises image information reading means 130. The image information reading means 130 reads outputs of the photoelectric conversion devices 21, 21, . . . constituting the line sensor 120 and feeds out an image signal, which is made up of the outputs, into an image processing unit, or the like.

As described above, in this embodiment, the first distributed index lens array 15 is located so as to form the image of the area of the sheet 50 as the aerial image IM. Also, the second distributed index lens array 16 is located so as to form an image of the aerial image IM, which has been formed by the first distributed index lens array 15, on the light receiving surfaces of the photoelectric conversion devices 21, 21, . . . constituting the line sensor 120. With such a constitution, it is possible to constitute an image forming optical system for forming an image (an erect equi-magnification image) of the emission area of the emitted light M on the sheet 50 in one-to-one size relationship on the light receiving surfaces of the photoelectric conversion devices 21, 21, . . . .

The optical system 12, which is constituted of the converging lens and the toric lens, converges and expands the laser beam L, which comes from the BLD 11, into a desired irradiation area on the dichroic mirror 14. (The optical system 12 expands the laser beam L along the linear emission direction of the laser beam L.)

As illustrated in FIG. 2, the line sensor 120 comprises a plurality of (e.g., at least 1,000 pieces of) photoelectric conversion devices 21, 21, . . . arrayed along the direction indicated by the double-headed arrow X. Each of the photoelectric conversion devices 21, 21, . . . constituting the line sensor 120 has the light receiving surface having a size of approximately 100 $\mu$m×100 $\mu$m. The magnification ratio of the image forming optical system, which is constituted of the first distributed index lens array and the second distributed index lens array 16, is 1:1 (equi-magnification). Therefore, each of the photoelectric conversion devices 21, 21, . . . can receive the emitted light M occurring from part having a size of approximately 100 $\mu$m×100 $\mu$m on the surface of the sheet 50. As the photoelectric conversion devices 21, 21, . . . , amorphous silicon sensors, CCD image sensors, MOS image sensors, or the like, may be employed.

How this embodiment of the radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 130.

The BLD 11 radiates out the laser beam L having a linear pattern with a line width of approximately 100 μm. The laser beam L is radiated out approximately in parallel with the surface of the sheet 50. The laser beam L is converged and linearly expanded by the optical system 12, which is constituted of the converging lens and the toric lens and is located in the optical path of the laser beam L. The laser beam L impinges (is converged) in the linear pattern upon the dichroic mirror 14. The laser beam L, which thus impinges (is converged) in the linear pattern upon the dichroic mirror 14, is reflected from the dichroic mirror 14 toward the surface of the sheet 50. The reflected laser beam L is converged by the first distributed index lens array 15 into a linear beam (having a line width $d_L$ of approximately 100 μm) extending along the direction indicated by the arrow X on the sheet 50.

The dichroic mirror 14 is located such that the image of the linear area on the dichroic mirror 14 (i.e., the linear area upon which the laser beam L impinges in the linear pattern) is formed by the first distributed index lens array 15 onto the linear area extending along the direction indicated by the arrow X on the sheet 50 (i.e., the linear area onto which the laser beam L is converged as the linear beam having a line width $d_L$ of approximately 100 μm).

The laser beam L impinging upon the sheet 50 is advantageous over the fluorescence produced by a fluorescent lamp and light radiated out from an LED array in that the directivity of the stimulating rays is high, the intensity of the stimulating rays is high, and therefore high stimulation energy can be imparted to the stimulable phosphor sheet. Accordingly, the laser beam L can sufficiently stimulate the stimulable phosphor at the exposed area (having a line width $d_L$ of approximately 100 μm). As a result, the light M of high intensity carrying the image information stored on the sheet 50 is emitted by the stimulable phosphor at the exposed area.

The image of the light M emitted by the sheet 50 is formed by the image forming optical system, which is constituted of the first distributed index lens array 15 and the second distributed index lens array 16, onto each of the light receiving surfaces of the photoelectric conversion devices 21, 21, . . . constituting the line sensor 120. At this time, the laser beam L, which has been reflected from the surface of the sheet 50 and is mixed slightly in the emitted light M having passed through the second distributed index lens array 16, is filtered out by the stimulating ray cut-off filter 17. The stimulating ray cut-off filter 17 (such as a sharp cut filter or a band pass filter) transmits the emitted light M and filters out the stimulating rays. Therefore, the stimulating rays can be prevented from impinging upon the line sensor 120.

The emitted light M having passed through the stimulating ray cut-off filter 17 is received by the photoelectric conversion devices 21, 21, . . . constituting the line sensor 120 and photoelectrically converted into signal components of an image signal S. The signal components of the image signal S are fed into the image information reading means 130 and fed out into the image processing unit, or the like, such that it may be clear which signal component corresponds to which position on the sheet 50 corresponding to the amount of displacement of the scanning belt 40.

As described above, with the first embodiment of the radiation image read-out apparatus in accordance with the present invention, the image forming optical system, which is constituted of the two distributed index lens arrays 15 and 16, is located in the optical path between the line light source for linearly irradiating the stimulating rays onto the stimulable phosphor sheet 50 and the line sensor 120 for receiving the light, which is emitted by the stimulable phosphor sheet 50 when the stimulable phosphor sheet 50 is exposed to the stimulating rays produced by the line light source, and photoelectrically converting the emitted light. Therefore, the linear image of the emitted light on the light emission surface of the stimulable phosphor sheet 50 can be directly formed on the light receiving surface of the line sensor 120. Accordingly, even if the image forming optical system for collecting (forming the image of) the light emitted by the stimulable phosphor sheet 50 is located at a spacing from the stimulable phosphor sheet 50, the intensity of light emitted by the stimulable phosphor sheet 50 and the position from which the light is emitted can be detected with a high light collecting efficiency and a high spatial resolution, and an image having a high sharpness can be formed from the image signal information having been obtained from the detection of the emitted light.

The radiation image read-out apparatus in accordance with the present invention may further comprises monitoring means 60 (shown in FIG. 1A) for monitoring the intensity of the laser beam L radiated out of the BLD 11, and BLD modulating means 70 for modulating the BLD 11 in accordance with the results of the monitoring with the monitoring means 60 such that the power of the BLD 11 may become equal to a predetermined value. When fluctuation in intensity of the laser beam L radiated out of the BLD 11 is detected, the BLD 11 may be modulated by the BLD modulating means 70 such that the intensity of the laser beam L may become equal to a predetermined value.

Figure 3A:
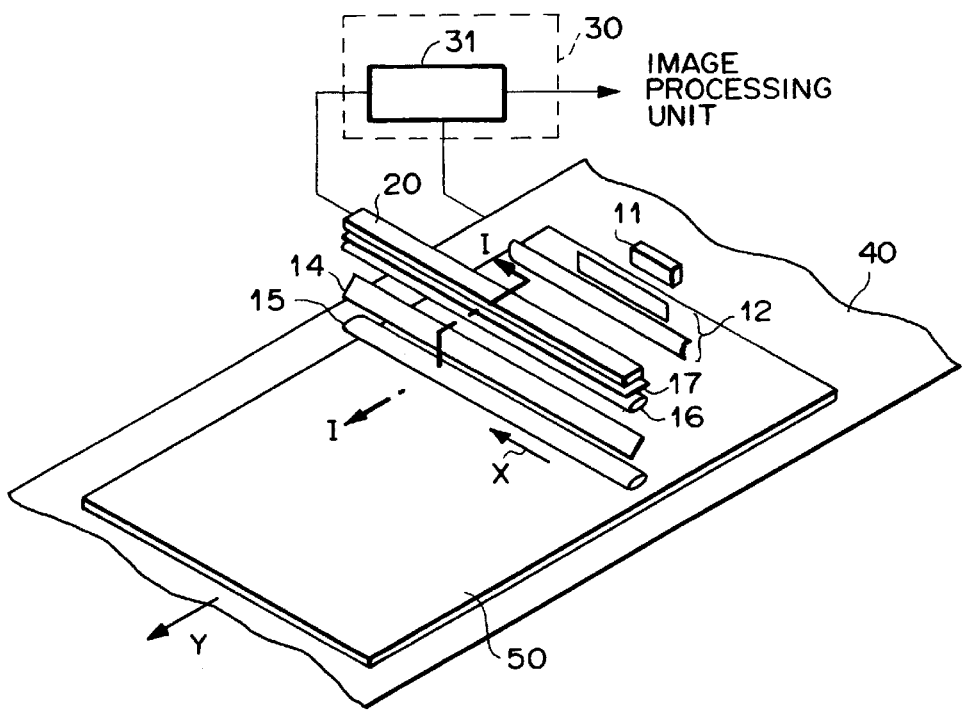
FIG. 3A is a perspective view showing a second embodiment of the radiation image read-out apparatus in accordance with the present invention.
Figure 3B:
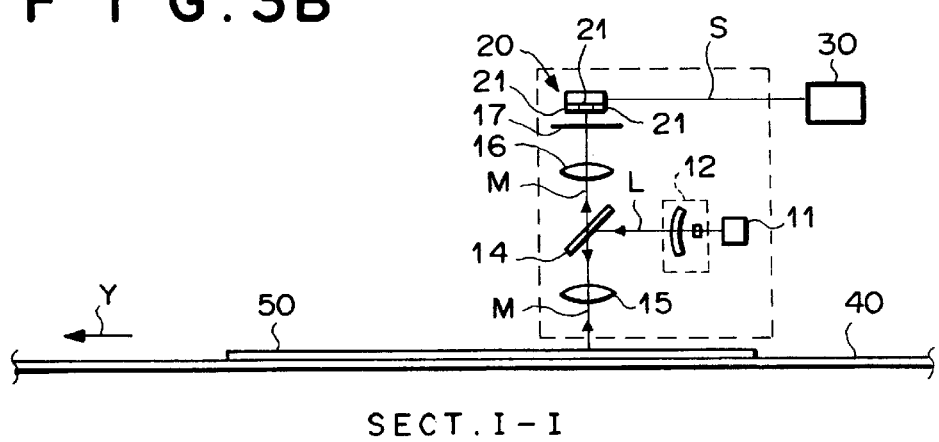
FIG. 3B is a sectional view taken on line I—I of FIG. 3A.

A second embodiment of the radiation image read-out apparatus in accordance with the present invention will be described hereinbelow. FIG. 3A is a perspective view showing a second embodiment of the radiation image read-out apparatus in accordance with the present invention. FIG. 3B is a sectional view taken on line I—I of FIG. 3A. FIG. 4 is an explanatory view showing a line sensor in the embodiment of FIG. 3A.

With reference to FIGS. 3A and 3B, the radiation image read-out apparatus comprises the scanning belt 40 for supporting the sheet 50, on which a radiation image has been stored, and conveying the sheet 50 in the direction indicated by the arrow Y. The radiation image read-out apparatus also comprises the BLD 11 for radiating out the laser beam L having a linear pattern with a line width of approximately 100 μm. The laser beam L is radiated out approximately in parallel with the surface of the sheet 50. The radiation image read-out apparatus further comprises the optical system 12, which is constituted of the combination of the converging for converging the linear laser beam L having been radiated out of the BLD 11 and the toric lens for expanding the beam only in one direction. The radiation image read-out apparatus still further comprises the dichroic mirror 14, which is located at an angle of 45 degrees with respect to the surface of the sheet 50 and which is set so as to reflect the laser beam L and to transmit emitted light M described later. The radiation image read-out apparatus also comprises the first distributed index lens array (constituted of an array of a plurality of distributed index lenses) 15. The first distributed index lens array 15 converges (forms the image of) the linear laser beam L, which has been reflected from the dichroic mirror 14, into a linear beam (having a line width of approximately 100 μm) extending along the direction indicated by the arrow X on the sheet 50. Also, the first distributed index lens array 15 forms an image of the emitted M, which is emitted by the sheet 50 exposed to the linearly converged laser beam L and which carries image information of the radiation image stored on the sheet 50, as an aerial image IM in the vicinity of the dichroic mirror 14. The radiation image read-out apparatus further comprises the second distributed index lens array 16 for forming an image of the aerial image IM, which has been formed by the first distributed index lens array 15, on light receiving surfaces of photoelectric conversion devices 21, 21, . . . constituting a line sensor 20, which will be described later. The radiation image read-out apparatus still further comprises the stimulating ray cut-off filter 17 for transmitting only the emitted light M and filtering out the laser beam L, which has been reflected from the surface of the sheet 50 and which is mixed slightly in the emitted light M having passed through the second distributed index lens array 16. The radiation image read-out apparatus also comprises the line sensor 20, which is constituted of a plurality of photoelectric conversion devices 21, 21, . . . for receiving the emitted light M having passed through the stimulating ray cut-off filter 17 and for photoelectrically converting the emitted light M. The radiation image read-out apparatus further comprises image information reading means 30. The image information reading means 30 is provided with addition means 31 for performing addition processing on outputs of the photoelectric conversion devices 21, 21, . . . constituting the line sensor 20, which outputs correspond to an identical site on the sheet 50. The image information reading means 30 feeds out an image signal having been obtained from the addition processing.

As described above, in this embodiment, the first distributed index lens array 15 is located so as to form the image of the area of the sheet 50 as the aerial image IM. Also, the second distributed index lens array 16 is located so as to form an image of the aerial image IM, which has been formed by the first distributed index lens array 15, on the light receiving surfaces of the photoelectric conversion devices 21, 21, . . . constituting the line sensor 120. With such a constitution, it is possible to constitute an image forming optical system for forming an image of the emission area of the emitted light M on the sheet 50 on the light receiving surfaces of the photoelectric conversion devices 21, 21, . . . .

The optical system 12, which is constituted of the converging lens and the toric lens, converges and expands the laser beam L, which comes from the BLD 11, into a desired irradiation area on the dichroic mirror 14. (The optical system 12 expands the laser beam L along the linear emission direction of the laser beam L.)

As illustrated in FIG. 4, the line sensor 20 comprises a plurality of (e.g., at least 1,000 pieces of) photoelectric conversion devices 21, 21, . . . arrayed in each row along the direction indicated by the double-headed arrow X. Three such rows of the photoelectric conversion devices 21, 21, . . . extending in the direction indicated by the double-headed arrow X stand side by side in the direction of conveyance of the sheet 50 (i.e., in the direction indicated by the arrow Y).

Each of the photoelectric conversion devices 21, 21, . . . constituting the line sensor 20 has the light receiving surface having a size of approximately 100 μm×100 μm. In cases where the magnification ratio of the image forming optical system, which is constituted of the first distributed index lens array 15 and the second distributed index lens array 16, is 1:1 (equi-magnification), each of the photoelectric conversion devices 21, 21, . . . can receive the emitted light M occurring from part having a size of approximately 100 μm×100 μm on the surface of the sheet 50. As the photoelectric conversion devices 21, 21, . . . , amorphous silicon sensors, CCD image sensors, MOS image sensors, or the like, may be employed.

As the addition processing performed by the addition means 31, simple addition processing, weighted addition processing, or the like, may be employed. Also, in lieu of the addition means 31, one of other kinds of operation processing means for performing one of other kinds of operation processing may be provided.

How the second embodiment of the radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the addition means 31.

Figure 5A:
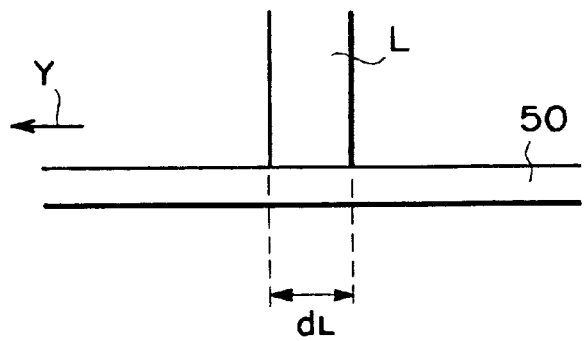
FIG. 5C is a graph showing an intensity distribution of the emitted light along the beam width direction.

The BLD 11 radiates out the laser beam L having a linear pattern with a line width of approximately 100 μm. The laser beam L is radiated out approximately in parallel with the surface of the sheet 50. The laser beam L is converged and linearly expanded by the optical system 12, which is constituted of the converging lens and the toric lens and is located in the optical path of the laser beam L. The laser beam L impinges (is converged) in the linear pattern upon the dichroic mirror 14. The laser beam L, which thus impinges (is converged) in the linear pattern upon the dichroic mirror 14, is reflected from the dichroic mirror 14 toward the surface of the sheet 50. As illustrated in FIG. 5A, the reflected laser beam L is converged by the first distributed index lens array 15 into a linear beam (having a line width $d_L$ of approximately 100 μm) extending along the direction indicated by the arrow X on the sheet 50.

The dichroic mirror 14 is located such that the image of the linear area on the dichroic mirror 14 (i.e., the linear area upon which the laser beam L impinges in the linear pattern) is formed by the first distributed index lens array 15 onto the linear area extending along the direction indicated by the arrow X on the sheet 50 (i.e., the linear area onto which the laser beam L is converged as the linear beam having a line width $d_L$ of approximately 100 μm).

The laser beam L impinging upon the sheet 50 is advantageous over the fluorescence produced by a fluorescent lamp and light radiated out from an LED array in that the directivity of the stimulating rays is high, the intensity of the stimulating rays is high, and therefore high stimulation energy can be imparted to the stimulable phosphor sheet. Accordingly, the laser beam L can sufficiently stimulate the stimulable phosphor at the exposed area (having a line width $d_L$ of approximately 100 μm). As a result, the light M of high intensity carrying the image information stored on the sheet 50 is emitted by the stimulable phosphor at the exposed area.

Figure 5B:
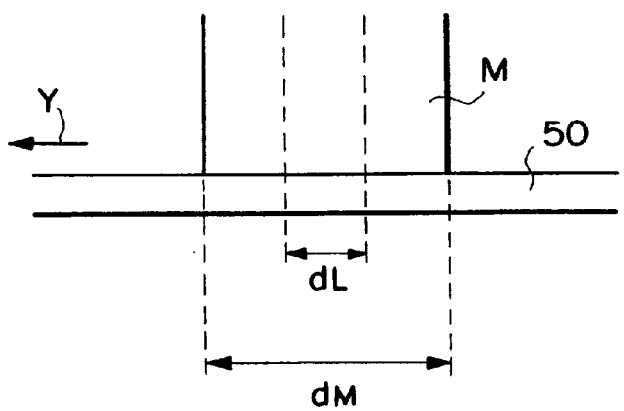
Figure 5C:
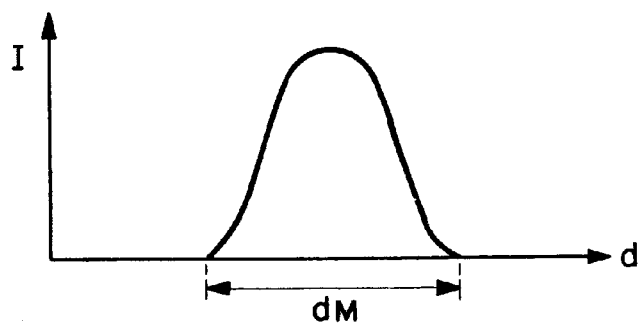

As illustrated in FIG. 5B, the linear laser beam L impinging upon the sheet 50 stimulate s the stimulable phosphor at the exposed area (having a line width $d_L$ of approximately 100 μm). The laser beam L also enters into the sheet 50 from the exposed area, is scattered to the areas neighboring with the exposed area, and stimulates the stimulable phosphor at the neighboring areas. In this manner, the stimulable phosphor at the area (having a line width $d_M$) containing the exposed area and the neighboring areas is stimulated. As a result, the light M carrying the image information stored on the sheet 50 is emitted from the area (having a line width $d_M$) containing the exposed area and the neighboring areas. The emitted light M has an intensity distribution along the line width direction shown in FIG. 5C.

The image of the light M emitted from the area of the sheet 50 having the line width $d_M$ is formed by the image forming optical system, which is constituted of the first distributed index lens array 15 and the second distributed index lens array 16, onto each of the light receiving surfaces of the photoelectric conversion devices 21, 21, . . . constituting the line sensor 20. At this time, the laser beam L, which has been reflected from the surface of the sheet 50 and is mixed slightly in the emitted light M having passed through the second distributed index lens array 16, is filtered out by the stimulating ray cut-off filter 17.

As illustrated in FIG. 4, the relationship between the size of each photoelectric conversion device 21 and the distribution of the emitted light M on the light receiving surface of the line sensor 20 is set such that the line width $d_M$ of the emitted light M on the surface of the sheet 50 may correspond to the total width (of approximately 300 μm) of the three rows of the photoelectric conversion devices 21, 21, . . . standing side by side in the direction indicated by the arrow Y.

The line sensor 20 photoelectrically converts the emitted light M, which has been received by each of the photoelectric conversion devices 21, 21, . . . , and obtains signal components of an image signal S from the photoelectric conversion devices 21, 21, . . . The image signal S made up of the thus obtained signal components is fed into the addition means 31.

In accordance with the movement speed of the scanning belt 40, the addition means 31 cumulates and stores the signal components of the image signal S, which have been received from the photoelectric conversion devices 21, 21, . . . , in memory regions corresponding to respective sites on the sheet 50.

How the signal components of the image signal S are cumulated and stored will hereinbelow be described in detail with reference to FIGS. 6A, 6B, 6C, and FIG. 7.

Figure 6A:
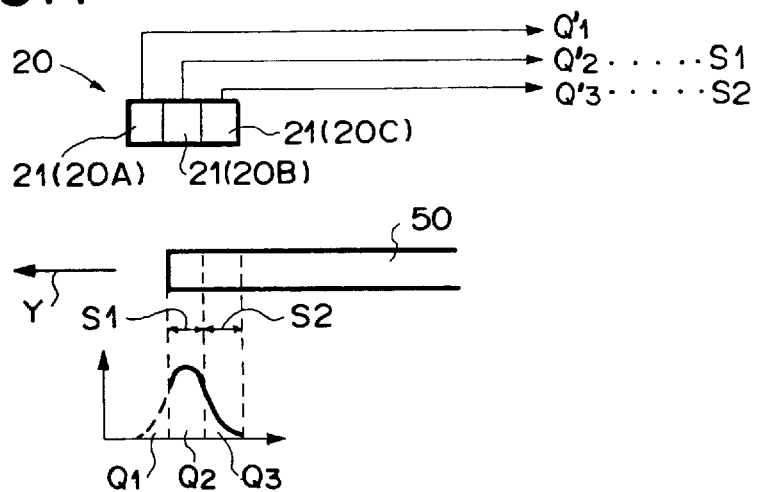
FIGS. 6A, 6B, and 6C are explanatory views showing how the embodiment of FIG. 3A operates.

Firstly, as illustrated in FIG. 6A, in cases where the laser beam L is converged onto a site S1 at the leading end of the sheet 50, as viewed in the conveyance direction of the sheet 50 (indicated by the arrow Y), the light M having the intensity distribution shown in FIG. 6A is emitted from the leading end site S1 and a neighboring site S2 on the sheet 50. The light quantity of the light M emitted from the site S1 on the sheet 50 is equal to Q2. The emitted light M of the light quantity Q2 is received by a photoelectric conversion device 21, which belongs to a photoelectric conversion device row 20B shown in FIG. 4 and which corresponds to the site S1 on the sheet 50. (This is because the image of the site on the sheet 50 is formed by the image forming optical system, which is constituted of the first distributed index lens array 15 and the second distributed index lens array 16, on the light receiving surface of the photoelectric conversion device 21.) The light quantity of the light M emitted from the site S2 on the sheet 50 is equal to Q3. The emitted light M of the light quantity Q3 is received by a photoelectric conversion device 21, which belongs to a photoelectric conversion device row 20C and which corresponds to the site S2 on the sheet 50. (This is due to the same reasons as those described above.)

Figure 7:
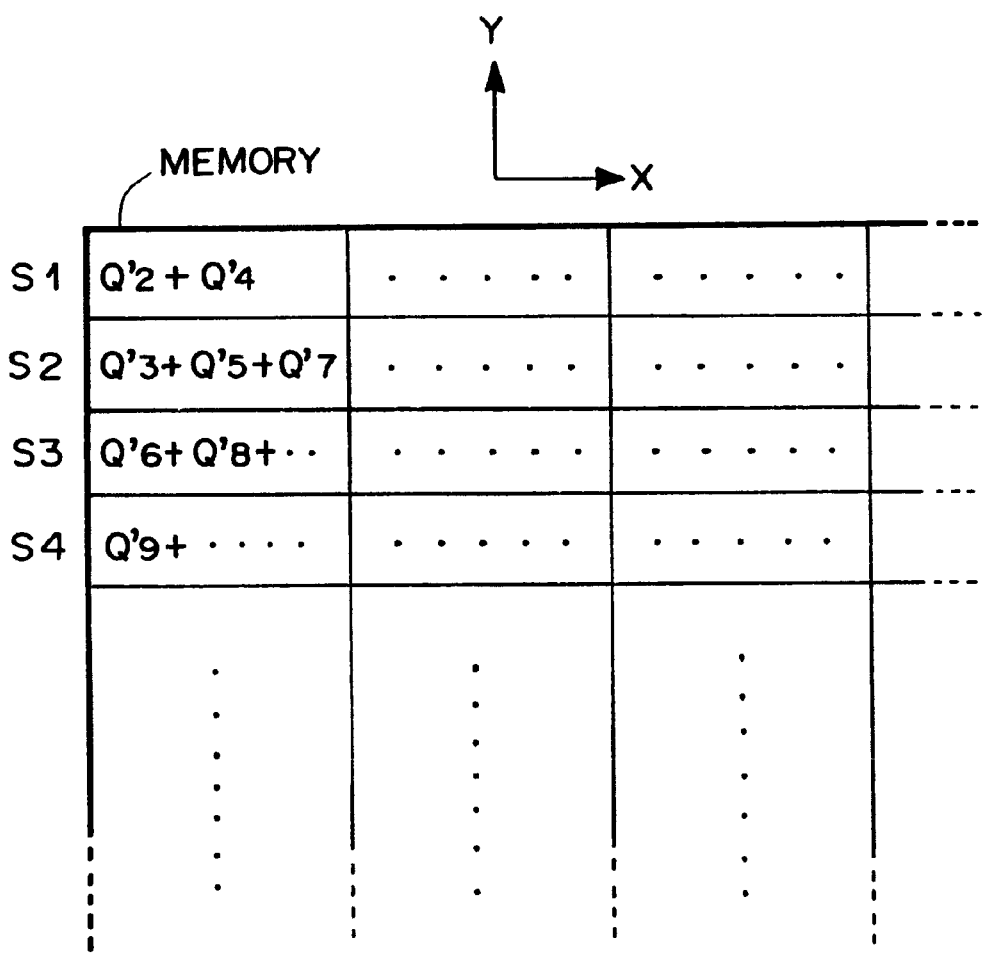
FIG. 7 is a conceptual view showing memory regions in a memory of addition means, which correspond to sites on a stimulable phosphor sheet.

The photoelectric conversion device 21 of the row 20B photoelectrically converts the emitted light M of the light quantity Q2 into an electric charge Q'2 and transfers the electric charge Q'2 into the addition means 31. As illustrated in FIG. 7, in accordance with the scanning speed of the scanning belt 40, the addition means 31 stores information representing the electric charge Q'2, which has been received from the photoelectric conversion device 21 of the row 20B, in a memory region corresponding to the site S1 on the sheet 50. Also, the photoelectric conversion device 21 of the row 20C photoelectrically converts the emitted light M of the light quantity Q3 into an electric charge Q'3 and transfers the electric charge Q'3 into the addition means 31. The addition means 31 stores the information representing the electric charge Q'3 in a memory region corresponding to the site S2 on the sheet 50.

Figure 6B:
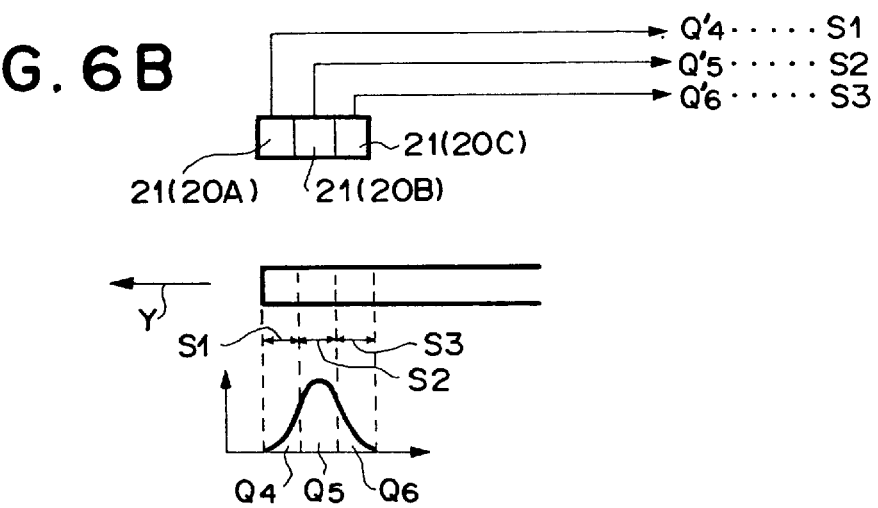

Thereafter, as illustrated in FIG. 6B, the sheet 50 is conveyed, and the stimulating rays L are converged onto the site S2 on the sheet 50. In this state, as described above, the light M is emitted from the site S2 and the neighboring sites S1 and S3 on the sheet 50. The light M of a light quantity Q4 is emitted from the site S1, the light M of a light quantity Q5 is emitted from the site S2, and the light M of a light quantity Q6 is emitted from the site S3. The emitted light M is received by the corresponding photoelectric conversion device 21 of the row 20A, the corresponding photoelectric conversion device 21 of the row 20B, and the corresponding photoelectric conversion device 21 of the row 20C.

The photoelectric conversion device 21 of the row 20A, the photoelectric conversion device 21 of the row 20B, and the photoelectric conversion device 21 of the row 20C convert the emitted light M into electric charges Q'4, Q'5, and Q'6 and transfer them into the addition means 31.

In accordance with the scanning speed of the scanning belt 40, the addition means 31 stores pieces of information representing the electric charges Q'4, Q'5, and Q'6, which have been received respectively from the photoelectric conversion device 21 of the row 20A, the photoelectric conversion device 21 of the row 20B, and the photoelectric conversion device 21 of the row 20C, in memory regions corresponding to the sites S1, S2, and S3 on the sheet 50. In the memory region corresponding to the site S1, the value of the electric charge Q'4 is added to the previously stored value of the electric charge Q'2. Also, in the memory region corresponding to the site S2, the value of the electric charge Q'5 is added to the previously stored value of the electric charge Q'3.

Figure 6C:
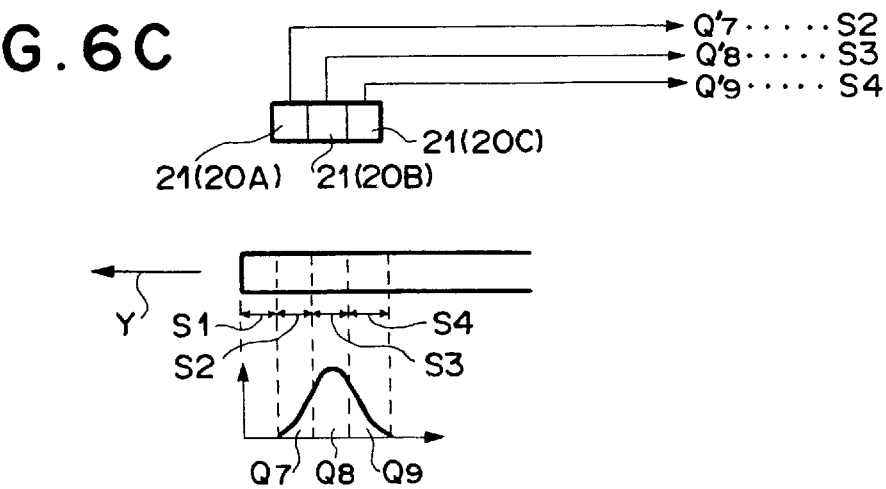

As illustrated in FIG. 6C, the sheet 50 is then conveyed, and the stimulating rays L are converged onto the site S3 on the sheet 50. In this state, in the same manner as that described above, pieces of information representing electric charges Q'7, Q'8, and Q'9, which have been received respectively from the photoelectric conversion device 21 of the row 20A, the photoelectric conversion device 21 of the row 20B, and the photoelectric conversion device 21 of the row 20C, are stored in the memory regions corresponding to the sites S2, S3, and S4 on the sheet 50 and added to the previous stored values.

The operation described above is iterated at respective positions of conveyance of the sheet 50. In this manner, as illustrated in FIG. 7, the total sum of the emitted light M having been received at the respective positions of conveyance of the sheet 50 is stored in the memory region of the addition means 31 corresponding to each site on the sheet 50.

The image signal having thus been stored in the memory is fed from the image information reading means 30 into an external image processing unit, or the like.

The distributed index lens array may be formed by arraying the distributed index lenses in a flat plane-like form so as to satisfy the formula shown below.

$$N \times \{1 - \cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens. In such cases, the movement of the stimulable phosphor sheet 50 with respect to the optical system, which comprises the line light source, the line sensor, the distributed index lens arrays, and the like, is not obstructed, and the light collecting efficiency can be kept high.

As described above, with the second embodiment, as in the first embodiment, the intensity of light emitted by the stimulable phosphor sheet 50 and the position from which the light is emitted can be detected with a high light collecting efficiency and a high spatial resolution. Specifically, with the second embodiment, the line sensor comprises multiple rows of the photoelectric conversion devices 21, 21, . . . standing side by side in the light receiving width direction. Therefore, even if the line width $d_M$ of the emitted light M (i.e., the line width on the light receiving surface of each photoelectric conversion device 21) becomes larger than the light receiving width $d_P$ of each photoelectric conversion device 21, the line sensor 20 as a whole can receive the emitted light M over approximately the entire line width of the emitted light. Accordingly, the light receiving efficiency can be enhanced. Also, the addition means 31 performs the addition processing on the outputs of the photoelectric conversion devices 21, 21, . . . constituting the line sensor 20, which outputs have been obtained at respective positions of sheet movement performed by the scanning belt 40 and which outputs correspond to an identical site on the sheet 50. In this manner, the light amounts having been detected with respect to an identical site on the sheet 50 are added together, and the image signal is obtained.

Further, the light received by the light receiving surface of the line sensor 20 is obtained by forming the image of the linear light emission area of the emitted light onto the light receiving areas of the photoelectric conversion devices 21, 21, . . . by the utilization of the image forming optical system, which is constituted of the first distributed index lens array 15 and the second distributed index lens array 16. Therefore, the information at the light emission surface can be detected accurately on the light receiving surface of the line sensor 20. Also, the intensity of light emitted by the stimulable phosphor sheet 50 and the position from which the light is emitted can be detected with a high light collecting efficiency and a high spatial resolution, and an image having a high sharpness can be formed from the image signal information having been obtained from the detection of the emitted light.

The radiation image read-out apparatus in accordance with the present invention is not limited to the embodiments described above and may be embodied in various other ways. For example, various known constitutions may be employed as the line light source, the line sensor, or the operation means. Also, the radiation image read-out apparatus in accordance with the present invention may further comprise an image processing unit, which performs various kinds of signal processing on the image signal obtained from the image information reading means 30, and/or erasing means for appropriately releasing radiation energy remaining on the sheet from which the image signal has been detected.

Figure 8A:
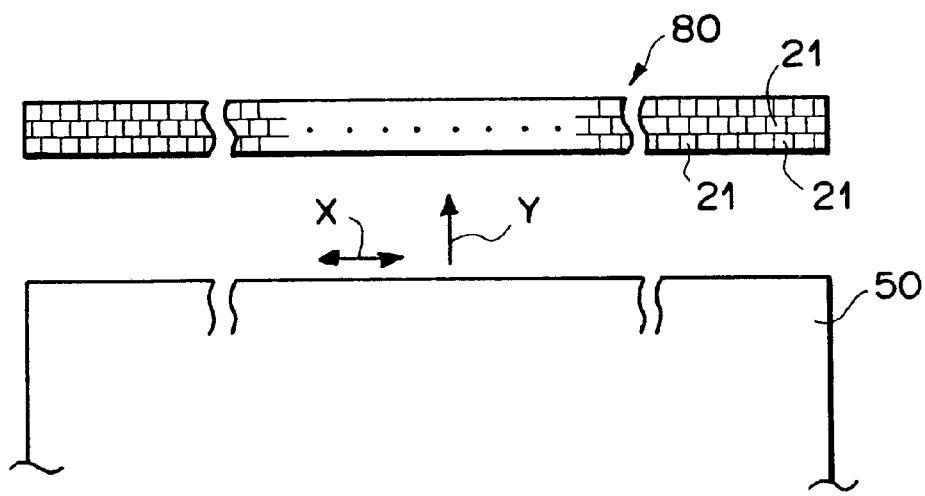
FIGS. 8A and 8B are explanatory views showing different examples of arraying of photoelectric conversion devices constituting the line sensor in the embodiment of FIG. 3A.
Figure 8B:
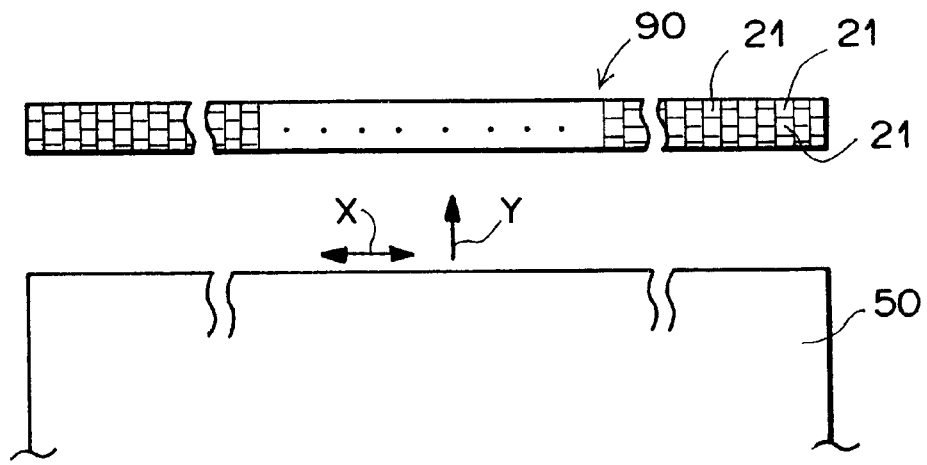

As illustrated in FIG. 4, the line sensor 20 employed in the second embodiment comprises the plurality of the photoelectric conversion devices 21, 21, . . . arrayed in the matrix-like pattern such that they may stand in a straight line along each of the length direction (i.e., the major axis direction) of the line sensor 20 and the direction (i.e., the minor axis direction) normal to the major axis direction. However, the line sensor employed in the radiation image read-out apparatus in accordance with the present invention is not limited to the constitution shown in FIG. 4. For example, as in a line sensor 80 illustrated in FIG. 8A, the photoelectric conversion devices 21, 21, may be arrayed such that they may stand in a straight line along the major axis direction (indicated by the double-headed arrow X) and in a zigzag pattern along the minor axis direction (indicated by the arrow Y). As another alternative, as in a line sensor 90 illustrated in FIG. 8B, the photoelectric conversion devices 21, 21, . . . may be arrayed such that they may stand in a straight line along the minor axis direction and in a zigzag pattern along the major axis direction.

In cases where the line sensor is constituted of a large number of photoelectric conversion devices and there is the risk that adverse effects will occur with respect to a transfer rate, memory devices corresponding to the respective photoelectric conversion devices may be utilized, and an electric charge having been accumulated in each of the photoelectric conversion devices during a charge accumulation period may be stored in the corresponding memory device. In the next charge accumulation period, the electric charge may be read from each memory device. In this manner, the charge accumulation time may be prevented from becoming short due to an increase in the charge transfer time.

Also, in the aforesaid two embodiments of the radiation image read-out apparatus in accordance with the present invention, part of the optical path, along which the laser beam L travels to the sheet 50, and part of the optical path, along which the emitted light M is guided to the line sensor 20, overlap each other, and the size of the apparatus is thereby reduced. Alternatively, for example, as illustrated in FIG. 9, the radiation image read-out apparatus in accordance with the present invention may be constituted such that the optical path of the laser beam L and the optical path of the emitted light M may not overlap each other.

Figure 9:
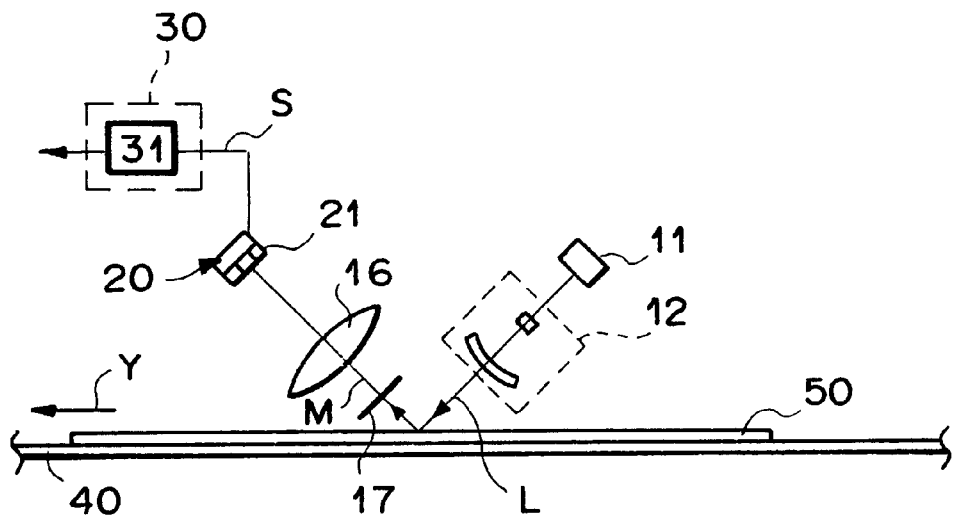
FIG. 9 is a sectional view showing a different embodiment of the radiation image read-out apparatus in accordance with the present invention.

Specifically, the radiation image read-out apparatus illustrated in FIG. 9 comprises the scanning belt 40 and the BLD 11 for radiating out the linear laser beam L at an angle of approximately 45 degrees with respect to the surface of the sheet 50. The radiation image read-out apparatus also comprises the optical system 12, which is constituted of a combination of a converging lens for converging the linear laser beam L having been radiated out of the BLD 11 and a toric lens for expanding the beam only in the direction of the linear pattern of the laser beam L, and which converges the linear laser beam L onto the surface of the sheet 50. The radiation image read-out apparatus further comprises the distributed index lens array 16 having an optical axis, which is inclined at an angle of approximately 45 degrees with respect to the surface of the sheet 50 and which is approximately normal to the direction of travel of the laser beam L.

The distributed index lens array 16 converges (forms the image of) the light M, which is emitted in the linear pattern by the sheet 50 when the sheet 50 is exposed to the laser beam L, in the linear pattern onto the light receiving surfaces of the photoelectric conversion devices 21, 21, . . . constituting the line sensor 20. The radiation image read-out apparatus still further comprises the stimulating ray cut-off filter 17 for transmitting only the emitted light M and filtering out the laser beam L, which is mixed slightly in the emitted light ROM impinging upon the distributed index lens array 16. The radiation image read-out apparatus also comprises the line sensor 20, which is constituted of the plurality of the photoelectric conversion devices 21, 21, . . . for receiving the emitted light M having passed through the stimulating ray cut-off filter 17 and for photoelectrically converting the emitted light M. The radiation image read-out apparatus further comprises the image information reading means 30. The image information reading means 30 is provided with the addition means 31 for performing addition processing on outputs of the photoelectric conversion devices 21, 21, constituting the line sensor 20, which outputs correspond to an identical site on the sheet 50. The image information reading means 30 feeds out an image signal having been obtained from the addition processing.

The distributed index lens array 16 employed in the embodiment of FIG. 9 comprises a plurality of image forming lenses, each of which forms the image (the erect equi-magnification image) of the emission area of the emitted light M on the sheet 50 in one-to-one size relationship on each of the light receiving surfaces of the photoelectric conversion devices 21, 21, . . . constituting the line sensor 20.

Figure 10:
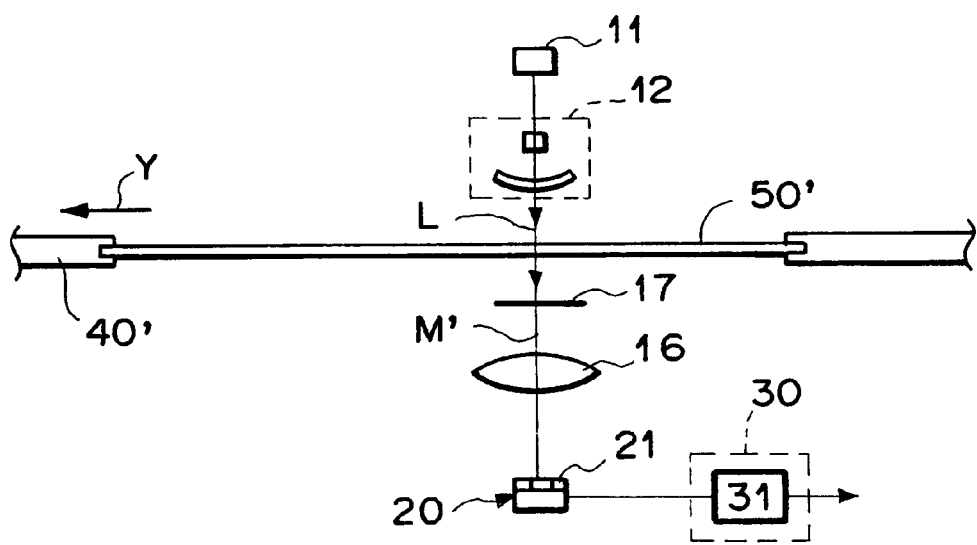
FIG. 10 is a sectional view showing a further different embodiment of the radiation image read-out apparatus in accordance with the present invention.

As another alternative, as illustrated in FIG. 10, a stimulable phosphor sheet 50' whose substrate is formed from a material permeable to the emitted light M may be employed, and the BLD 11 for producing the laser beam L and the line sensor 20 may be located on opposite surface sides of the sheet 50'. In this manner, the emitted light M emanating from the surface opposite to the surface of the sheet 50', upon which the laser beam L impinges, may be received by the line sensor 20.

Specifically, the radiation image read-out apparatus illustrated in FIG. 10 comprises a conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50'.) The radiation image read-out apparatus also comprises the BLD 11 for radiating out the linear laser beam L along the direction approximately normal to one surface of the sheet 50'. The radiation image read-out apparatus further comprises the optical system 12, which is constituted of a combination of a converging lens for converging the linear laser beam L having been radiated out of the BLD 11 and a toric lens for expanding the beam only in the direction of the linear pattern of the laser beam L, and which converges the linear laser beam L onto the one surface of the sheet 50'. The radiation image read-out apparatus still further comprises the distributed index lens array 16 having an optical axis, which is approximately normal to the one surface of the sheet 50'. The distributed index lens array 16 converges (forms the image of) light M', which is emitted in the linear pattern from the other surface of the sheet 50' when the sheet 50' is exposed to the laser beam L (i.e., the other surface opposite to the one surface on the laser beam incidence side), in the linear pattern onto the light receiving surfaces of the photoelectric conversion devices 21, 21, . . . constituting the line sensor 20. The radiation image read-out apparatus also comprises the stimulating ray cut-off filter 17 for transmitting only the emitted light M' and filtering out the laser beam L, which is mixed slightly in the emitted light M' impinging upon the distributed index lens array 16. The radiation image read-out apparatus further comprises the line sensor 20, which is constituted of the plurality of the photoelectric conversion devices 21, 21, . . . for receiving the emitted light M' having passed through the stimulating ray cut-off filter 17 and for photoelectrically converting the emitted light M'. The radiation image read-out apparatus still further comprises the image information reading means 30. The image information reading means 30 is provided with the addition means 31 for performing addition processing on outputs of the photoelectric conversion devices 21, 21, . . . constituting the line sensor 20, which outputs correspond to an identical site on the sheet 50'. The image information reading means 30 feeds out an image signal having been obtained from the As addition processing.

As in the embodiment of FIG. 9, the distributed index lens array 16 employed in the embodiment of FIG. 10 comprises a plurality of image forming lenses, each of which forms the image (the erect equi-magnification image) of the emission area of the emitted light M' on the sheet 50' in one-to-one size relationship on each of the light receiving surfaces of the photoelectric conversion devices 21, 21, . . . constituting the line sensor 20.

What is claimed is:

1. A radiation image read-out method, comprising the steps of:
    (i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation,
    (ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of photoelectric conversion devices arrayed along a length direction of the linear area of the stimulable phosphor sheet, the received light being subjected to photoelectric conversion performed by the line sensor, and
    (iii) moving the stimulable phosphor sheet with respect to the line light source and the line sensor and in a direction different from the length direction of the linear area of the stimulable phosphor sheet,
        wherein the light, which is emitted from the linear area of the one surface of the stimulable phosphor sheet or from the linear area of the other surface of the stimulable phosphor sheet, is converged by a distributed index lens array, which is located between the stimulable phosphor and the line sensor and which comprises a plurality of distributed index lenses arrayed along the length direction of the linear area of the stimulable phosphor sheet, wherein said distributed index lenses have an efficiency of at least 10%, wherein the distributed index lens array satisfies the formula:

$$N \times \{1 - \cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens.

2. A radiation image read-out method, comprising the steps of:
  (i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation,
  (ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of photoelectric conversion devices arrayed along a length direction of the linear area of the stimulable phosphor sheet, the received light being subjected to photoelectric conversion performed by the line sensor, and
  (iii) moving the stimulable phosphor sheet with respect to the line light source and the line sensor and in a direction different from the length direction of the linear area of the stimulable phosphor sheet,
    wherein the light, which is emitted from the linear area of the one surface of the stimulable phosphor sheet or from the linear area of the other surface of the stimulable phosphor sheet, is converged by a distributed index lens array, which is located between the stimulable phosphor and the line sensor and which comprises a plurality of distributed index lenses arrayed along the length direction of the linear area of the stimulable phosphor sheet, wherein said distributed index lenses have an efficiency of at least 10%,
    wherein the line sensor comprises a plurality of the photoelectric conversion devices arrayed along the length direction of the linear area of the stimulable phosphor sheet and along the direction different from the length direction of the linear area of the stimulable phosphor sheet,
    wherein the distributed index lens array satisfies the formula:

$$N \times \{1 - \cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens.

3. A radiation image read-out apparatus comprising:
  (i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation,
  (ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising a plurality of arrayed photoelectric conversion devices, and
  (iii) scanning means for moving the stimulable phosphor sheet with respect to the line light source and the line sensor and in a direction different from a length direction of the linear area of the stimulable phosphor sheet,
    wherein a distributed index lens array, which comprises a plurality of distributed index lenses arrayed along the length direction of the linear area of the stimulable phosphor sheet, is located between the stimulable phosphor sheet and the line sensor in order to converge the light, which is emitted from the linear area of the one surface of the stimulable phosphor sheet or from the linear area of the other surface of the stimulable phosphor sheet, wherein said distributed index lenses have an efficiency of at least 10%,
    wherein the distributed index lens array satisfies the formula:

$$N \times \{1 - \cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens.

4. A radiation image read-out apparatus comprising:
  (i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation,
  (ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising a plurality of arrayed photoelectric conversion devices, and
  (iii) scanning means for moving the stimulable phosphor sheet with respect to the line light source and the line sensor and in a direction different from a length direction of the linear area of the stimulable phosphor sheet,
    wherein a distributed index lens array, which comprises a plurality of distributed index lenses arrayed along the length direction of the linear area of the stimulable phosphor sheet, is located between the stimulable phosphor sheet and the line sensor in order to converge the light, which is emitted from the linear area of the one surface of the stimulable phosphor sheet or from the linear area of the other surface of the stimulable phosphor sheet, wherein said distributed index lenses have an efficiency of at least 10%,
    wherein the line sensor comprises a plurality of the photoelectric conversion devices arrayed along the length direction of the linear area of the stimulable phosphor sheet and along the direction different from the length direction of the linear area of the stimulable phosphor sheet, wherein the distributed index lens array satisfies the formula:

$$N \times \{1-\cos^3(\tan^{-1}(D/2Lo))\} \geq 0.1$$

in which D represents the diameter of the distributed index lens, Lo represents the working distance of the distributed index lens, and N represents the number of the distributed index lenses falling within the radius of field of the distributed index lens.

* * * * *